United States Patent [19]
Knis et al.

[11] 3,924,837
[45] Dec. 9, 1975

[54] AGITATOR INSERT FOR REACTIVE LIQUID POLYMER MIXER

[75] Inventors: Stephen A. Knis, Cheshire; Adnan A. R. Sayigh, North Haven, both of Conn.

[73] Assignee: The Upjohn Company, Kalamazoo, Mich.

[22] Filed: Dec. 23, 1974

[21] Appl. No.: 535,962

[52] U.S. Cl. ............................... 259/8; 23/252 R
[51] Int. Cl.² ........................................... B01F 7/16
[58] Field of Search ............ 259/7, 8, 9, 10, 23, 24, 259/43, 44, 25, 26, 6; 23/252; 425/4 R, 4 C, 208, 209; 260/2.5 R, 2.5 A, 2.5 BE

[56] References Cited
UNITED STATES PATENTS

| | | | |
|---|---|---|---|
| 2,868,518 | 1/1959 | Corby | 259/8 |
| 3,051,455 | 8/1962 | Magester | 259/7 |
| 3,212,128 | 10/1965 | Carlson | 425/4 |
| 3,385,671 | 5/1968 | Axelsson | 23/252 |
| 3,420,506 | 1/1969 | Gurley | 259/7 |
| 3,674,720 | 7/1972 | Dunn | 259/7 |

*Primary Examiner*—Robert W. Jenkins
*Attorney, Agent, or Firm*—St. Onge Mayers Steward & Reens

[57] ABSTRACT

Improved mixing of reactive liquid polymer components is obtained in a standard rotary type mixing head having a basket type first stage mixing section in a multisection rotating agitator-impeller. The improvement is obtained by incorporating a specially formed rotor insert in the basket section to increase agitation and produce a passby wiping action at the feed orifices through which the several reactive components are introduced, but without making actual contact with the orifice tips.

4 Claims, 5 Drawing Figures

AGITATOR INSERT FOR REACTIVE LIQUID POLYMER MIXER

BACKGROUND OF THE INVENTION

For the mixing of highly reactive liquid components and more particularly polymerizable resin components, mixing heads are utilized to obtain the high degree of homogeneity in the admixing of the components that is needed to achieve and maintain uniform properties of the resulting product. Such mixing heads are commonly employed in the manufacture of both flexible and rigid polyurethane foams from admixtures of polyols and polyisocyanates, catalysts, blowing agents, and various other modifying components. These components are delivered separately or partially premixed as liquids to a mixing head having valve means for controlling the admission of each in accordance with some predetermined rate related to delivery of each of the other components. This mixing head has a nozzle assembly, removably attached to a face, from which nozzle the fully mixed but still liquid product is delivered to a mold or other receiver for shaping the product into desired form. Passages in the head lead from the respective component valves to feed orifices or ports having their tips or termini disposed within the area of the mixing head face encased by the nozzle assembly. The mixer head also includes a suitably journaled rotor shaft passing into the nozzle assembly where a multi-section agitator-impeller is secured to its end for high speed rotation within the nozzle housing. Typically the section of the agitator-impeller nearest the component feed orifices is a cylinder-like portion whose walls are slotted or foraminous and rotate in close proximity to the inner surface of the nozzle housing to produce a shearing action in the liquid to enhance the mixing action. The end of the cylinder nearest the component feed orifices is open to receive the components from the several orifices which are usually spaced circumferentially around the rotor axis. This cylindrical first stage section is commonly referred to as the "basket" section and produces a preliminary mixing of the several components, and usually some pumping action as well. Additional agitator-impeller sections of the rotor, having various configurations, are disposed axially along the rotor axis toward the nozzle exit, and these include helix and/or vane members designed to produce additional admixing and pumping of the reactive mixture as it is progressed toward the nozzle outlet.

Various different agitator-impeller configurations have been developed with the aim of securing maximum homogeneity of the reactive mix whereby to achieve desired physical properties of the final product, such as uniform cell isotropicity, uniform density and degree of flexibility in foamed polyurethane, for example. Typical of some of the proposals are those shown in prior U.S. Pat. Nos. 2,868,518; 3,212,128; 3,420,506 and 3,674,720. Difficulty with obtaining adequate mixing has nevertheless continued to plague the practical art. In addition, difficulty has also been encountered with devices of this type in respect to clogging of the feed orifices due to a tendency for build-up of the reactive mix to occur at or in the orifices, especially if the mixing-dispensing operation is intermittent, as is often the case, as in dispensing into a series of molds on a rotary indexing table.

It is a general purpose of the present invention to improve the operation of typical high speed agitator-impeller assemblies incorporating a first stage basket section by providing a spider-like insert for that section. The insert is mounted on the impeller shaft and is positioned within the open end of the basket section for rotation therewith. The insert comprises a member having a plurality of legs, each of such legs consisting of a first radial portion extending from a hub portion, an axial portion joined to the outer end of the first radial portion, and finally a second radially inwardly extending terminal portion joined to the other end of the axial portion. The terminal leg portions are disposed in the open end of the basket so as to place their upper surfaces in close proximity to the feed orifices, but not actually making contact with them. The radial portions of these spider legs thus produce a pass-by wiping action at the tips of the feed orifices which helps to prevent or remove any tendency for reactive product to accumulate at or in the orifices. Yet because no frictional contact is made, no wear of the orifices or heating thereof occurs to alter their carefully determined metering rate. The insert member constituting the invention is one which can be readily designed to fit existing rotary mixing head nozzles with little or no modification of the rest of the equipment. The device is illustrated in the accompanying drawings in which a typical mixing head nozzle assembly is shown to which the novel spider insert of this invention has been added.

Figure 1:
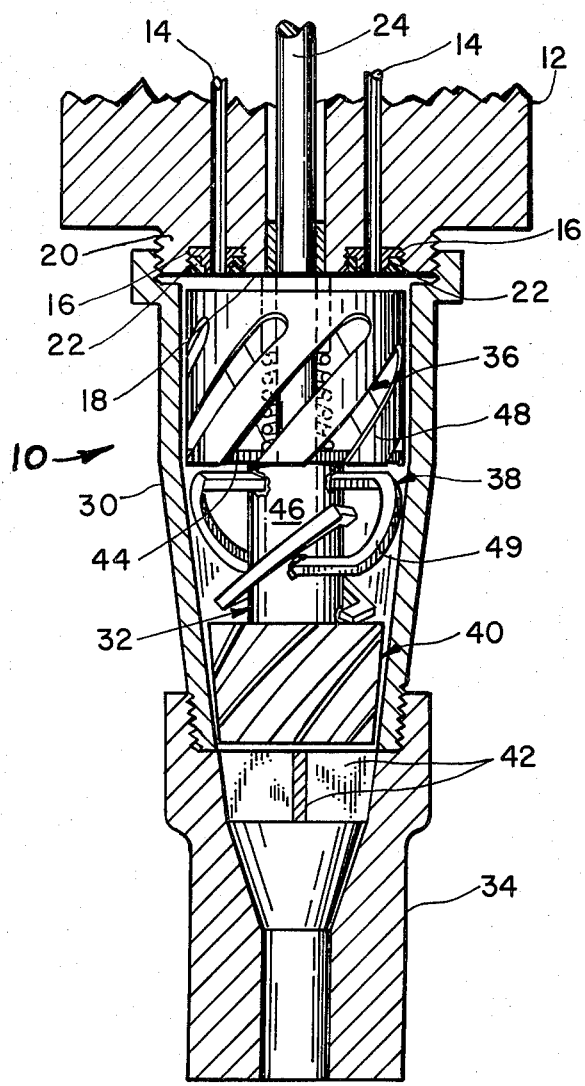
FIG. 1 is a fragmentary view in vertical section through a mixing head of standard type for producing foamed polyurethane.

A typical nozzle assembly for delivering a polyurethane foam mix to a mold or other receiving form for shaping the product as it expands is illustrated in FIG. 1, wherein the nozzle assembly 10 is removably mounted on the underface of a mixing head 12 of which only a fragmentary portion is shown. The head is formed with a plurality of drilled passages 14 through which individual components, or premixtures of several components, are fed to ports 16 which open onto the underface 18 of boss 20 of the head within the confines of the nozzle assembly. Passages 14 communicate with control valves (not shown) in the head which control the rate of delivery of the several liquid components supplied under pressure to the head from storage tanks. Each of ports 16 is provided with a Teflon orifice-forming insert or tip 22 removably retained in the sockets forming ports 16. Orifice tips 22 help, in conjunction with the mixing head valves, to meter the rate of fluid component delivered to the nozzle assembly. Mixing head 12 is also provided with a rotor shaft 24, suitably journalled in bearings in the head, and extending below face 18 of boss 20 to support and make driving connection with the rotor of the nozzle assembly.

Nozzle assembly 10 comprises on open-ended tubular casing 30 enclosing a rotary agitator 32 and having a removable pour spout 34. Removable attachment of housing 30 to boss 20, and of pour spout 34 to casing 30, may be of any suitable arrangement, such as the screw threads specifically illustrated in FIG. 1.

The rotary agitator 32 comprises a multisection agitator-impeller comprised of a first stage basket section 36, an intermediate stage helical agitator section 38 and a lower or terminal pumping section 40. A set of diametrically crossed vanes or baffles 42 is secured in the receiving end of pour spout 34.

In the operation of the mixer head, the reactive polymer components are introduced to nozzle assembly 10 through feed passages 14 and orifice tips 22. The latter are disposed circumferentially about the rotor shaft so as to discharge into the open end of basket section 36 of the rotary agitator assembly 32. Basket section 36 consists of a cylinder having a closed lower end 44 by which it is supported for rotation within the nozzle casing. This is effected by welding or otherwise securing the closed end of basket 36 to a hub 46 forming part of the center section of the agitator assembly. Hub 46 is secured to the lower end of rotor shaft 24 by threaded engagement or other suitable attachment means. Thus basket section 36 is rotated by shaft 24. The side wall 48 of basket 36 is generally slotted, or is made foraminous, to allow escape radially of fluid product introduced into the open end of the basket through orifice tips 22. These are spaced circumferentially about rotor shaft 24 so as to accommodate a plurality of feed passages which in some instances may run as high as seven or eight. Rotation of basket section 36 causes entering fluids to be thrown centrifugally outwardly through the apertures in the wall to impinge upon the inner surface of casing 30. The impact thus provided effects an initial mixing of the reactive components, and such mixing is further enhanced by close spacing of the basket wall 48 to the casing 30 to produce a shearing effect as the agitator is rotated. The fluid mixture then passes axially along the agitator assembly to the intermediate stage 38 where helical agitator bars or vanes 49 secured to hub 46 produce a whipping action to further homogenize the mix. From here the mix then passes axially down between the casing 30 and the vanes of the terminal pumping section 40 which discharges into the upper end of pour spout 34. The latter serves to control lateral throw-out of the fluid as it leaves the end of nozzle casing 30, and baffles 42 also assist in reducing the tubulence of the emerging stream.

Figure 2:
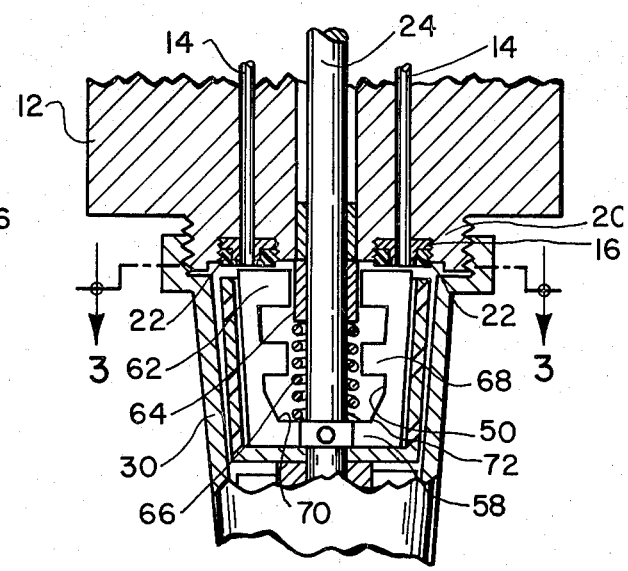
FIG. 2 is also a fragmentary view of the same mixing head incorporating the spider insert of this invention.
Figure 3:
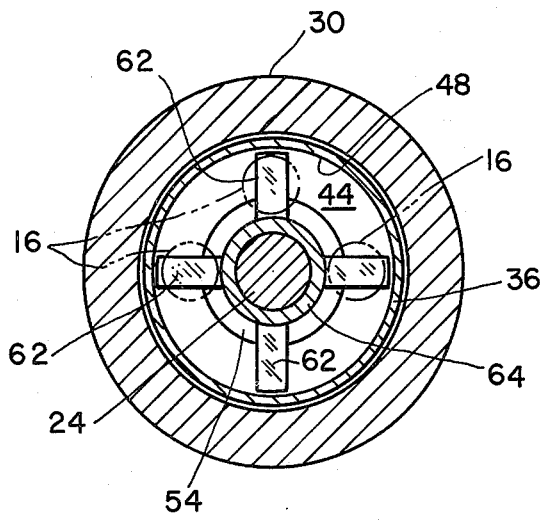
FIG. 3 is a cross section on line 3—3 of FIG. 2.
Figure 4:
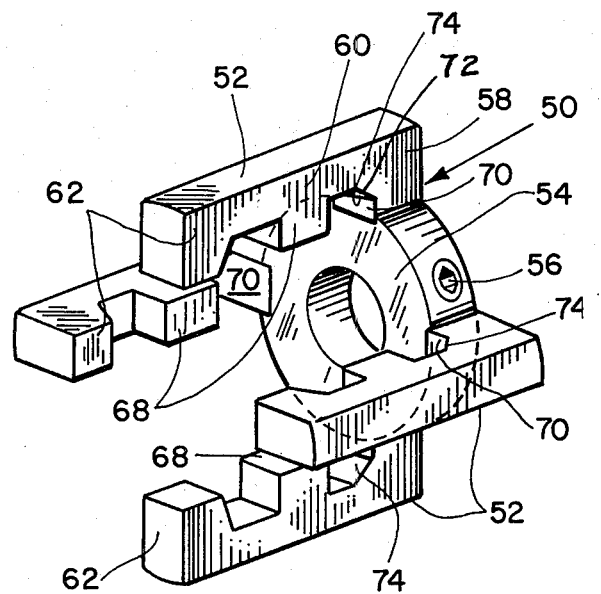
FIG. 4 is an enlarged perspective view of the spider insert itself.

The feature of this invention resides primarily in the use of a spider-like insert 50 suitably positioned in the open end of basket section 36 of the rotating agitator. A suitable configuration of such spider 50 is shown in some detail in FIG. 4 and its placement in the basket section is shown in FIGS. 2 and 3. It consists in this instance of two sets of diametrically opposed legs 52 radiating from a central hub region 54 apertured to receive rotor shaft 24. Suitable set screw means 56 is provided in hub 54 for securing spider member 50 to the shaft. As here seen, each of legs 52 is of E-shape, having a first, radially extending lower leg portion 58 joined to and supported from hub 54 to dispose an axially extending portion 60 in close proximity and parallel to the inner surface of the basket 36. At the upper end of each axial portion 60, a short radially inward extending portion 62 on each leg is provided. The inner ends of paired portions 62 confront each other in spaced relation to permit sliding reception between them of a bushing 64 on shaft 24. This bushing is biased by spring 66 against the under face 18 of boss 20 to form a seal about the shaft at that point. The upper faces of terminal leg portions 62 are, in turn, disposed in close but non-contacting relation to orifice tips 22. Generally speaking the spacing at this point is rather critical to obtain the desired by-pass wiping action without direct physical contact between the spider legs and orifice tips, such spacing being on the order of 0.010 inch to 0.015 inch for most polyurethane foam mix formulations. Actual contact between the faces of the spider legs and the inserted orifice tips is undesirable since this would cause heating due to the friction, resulting in physical change of the orifice size, adversely affecting the metering rate of the orifice.

The intermediate radially extending portion 68 of each leg functions to produce additional agitation in the basket section but is not always necessary. Additional pumping action on the mix is obtained by sloping a face of one of the radial leg portions obliquely to the plane of rotation, as by sloping faces 70 on lower leg portions 58. Since the rotor is operated at high speed, usually around 4000 RPM or more, some increased rigidity of the spider to withstand centrifugal forces is desirable and is provided by a reinforcing fillet 72 at the juncture of lower radial and axial leg portions 58, 60, respectively. Sloping of the inner faces 74 of these fillets may be used to produce more pumping and mixing action by the spider.

The invention is applicable to equipment handling any of the usual polyurethane foam mixes wherein the components include the usual organic polyisocyanates such as the tolylene diisocyanates, diphenyl methane diisocyanates, hexamethylene diisocyanate, xylene diisocyanate, etc., in combination with the usual polyhydroxy compounds such as poly(oxyalkylene) derivatives of glycerine, sorbital, and other cyclic or hetrocyclic polyhydric alcohols, hydroxy terminated reaction products of polycarboxylic acids and polyhydric alcohols, poly(oxyalkylene) diols, organic polyhydric alcohols, and the like. Additional components added separately or in admixture with the foregoing include blowing agents, surfactants, catalysts, fillers, pigments, fire retardant additives, U.V. stabilizers, antioxidants, etc.

The following examples illustrate the improvement afforded by the invention.

EXAMPLE 1

| Component A | |
|---|---|
| Isonate 580[1] | 134 |
| L-5340[2] | 1 |
| Fluorocarbon-11B[3] | 27.5 |
| | 162.5 |

| Component B | |
|---|---|
| Polyesterpolyol[4] | 35 |
| DEN-431[5] | 8 |
| Fyrol CEF[6] | 15 |
| DC-193[7] | 1 |
| Fluorocarbon-11B | 5.5 |
| | 64.5 |

| Component C | |
|---|---|
| Catalyst I[8] | 6.75 |
| Catalyst II[9] | 2.25 |
| N-Ethylmorpholine | 1.5 |
| | 10.5 |

[1] Isonate 580: A polymethylene polyphenylisocyanate supplied by The Upjohn Company.
[2] L-5340: A rigid foam silicone surfactant supplied by Union Carbide Corporation; see Union Carbide Bulletin F-42172A, October 1970.
[3] Fluorocarbon-11B: Trichlorofluoromethane, product of DuPont Corporation.
[4] Polyesterpolyol: The polyester used in this example was 24.8 parts of the product of esterifying 1 mole of chlorendic anhydride with 1.1 moles of diethylene glycol -continued and formed by the reaction of 3 moles of ethylene oxide with trimethylolpropane having an equivalent weight of about 93 and 2.2 parts of diethylene glycol.

[5]DEN 431: Dow epoxy novolac resin, viscosity of 76,500 cps. at 25°C, see "D.E.N. Epoxy Novolac Resins", The Dow Chemical Company, 1967, pgs. 1-2.

[6]Fyrol CEF: tris(betachloroethyl)phosphate; see Stauffer Production Data Sheet entitled Fyrol CEF, June 15, 1967.

[7]DC-193: A silicone surfactnat sold by Dow Corning Corporation; see: "Dow Corning 193 Surfactant", Bulletin: 05-146, February, 1966.

[8]Catalyst I: A solution consisting of 43 percent by weight of potassium N-phenyl-2-ethylhexamide, 28 percent by weight of ethylene glycol, and 29 percent by weight of dimethyl formamide.

[9]Catalyst II: A 50 percent solution of sodium N-(2-hydroxy-5-nonylphenyl)methyl-N-methyl glycinate in diethylene glycol.

These three liquid components are fed to respective feed ducts 14 of the mixing head and discharged through the several orifice tips 22 into basket 36 of the rotary agitator in the proportions indicated. The rotor used has a diameter of about 2 inches and is operated at a speed of around 4000 RPM. No spider insert 50 of the invention is employed in this case.

After a period of operation, production must be discontinued to allow the nozzle assembly to be removed from the head and manually cleaned of accumulations of reacted material, more particularly in the orifice tips. Solvent flushing of the nozzle while still attached to the mixing head can be provided by feeding a suitable solvent through a feed passage and orifice tip provided specifically for that purpose; but this solvent purge cycle cannot practically be used frequently enough to totally prevent the accumulation of reacted material in the orifices, and more particularly in the solvent orifice itself. Once this occurs, of course, no further solvent purge cycle is possible.

With the foregoing foam formulation, a maximum production run of about 2 hours is all that has been normally possible before the operation had to be stopped and the nozzle assembly removed to permit manual cleaning of the apparatus.

EXAMPLE 2

The same mix components as used in Example 1 are again employed in exactly the same manner and using the same mixer head and nozzle assembly as before, same ambient temperature condition and feed throughput. However, in this instance, a spider insert of the invention (specifically insert 50 described above) is mounted in the basket section of the rotor-agitator assembly of the nozzle.

Figure 5:
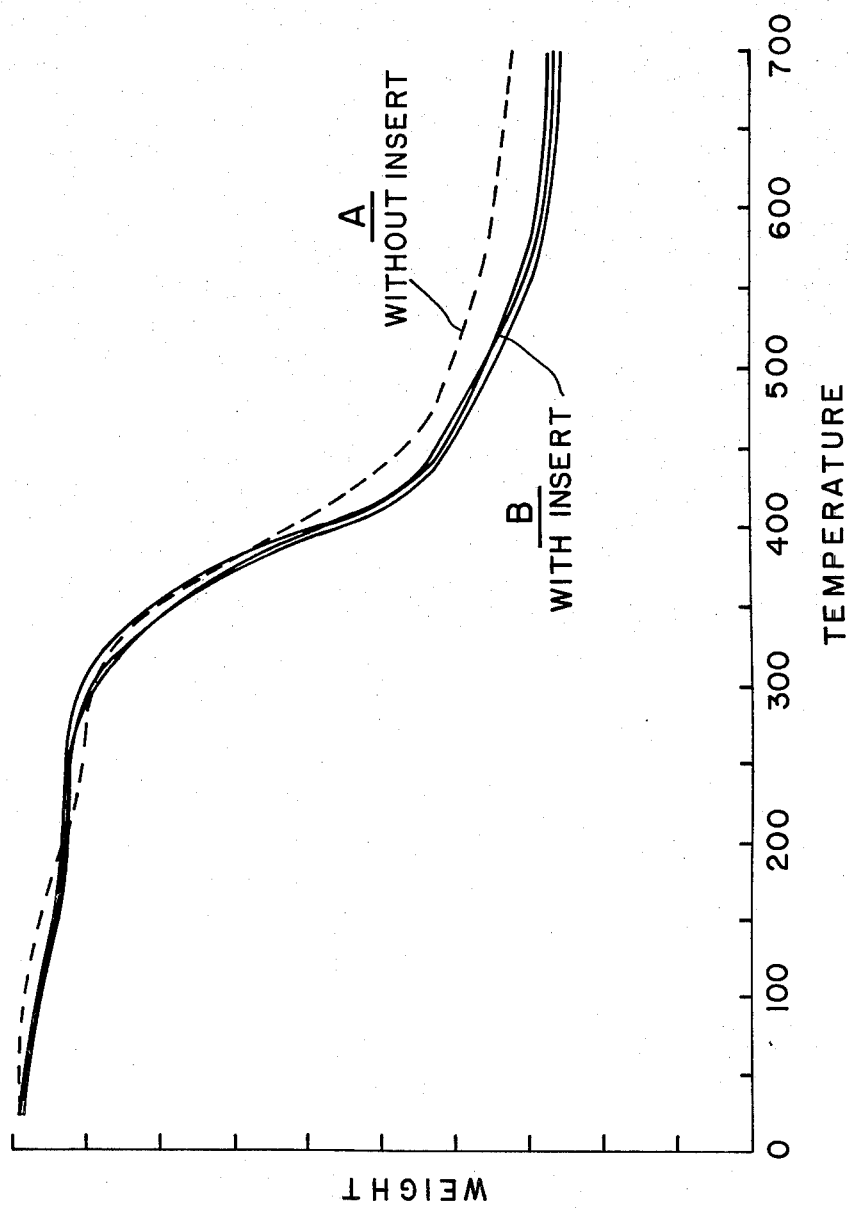
FIG. 5 is a graph comparing the results of thermographic analytical tests on foamed polyurethane products produced with and without the novel mixer insert.

Production for a full 8-hour shift, without need once to interrupt the operation for manual clean-out of the nozzle, is readily obtained in this case. Moreover, thermographic analysis of the final foam product obtained from this operation confirms that a substantially complete and uniform utilization of the catalyst components has occurred. This is shown by reference to the graph of FIG. 5.

If this same mix is prepared under small scale, ideal laboratory conditions to effect optimization of the desired properties of the final foam product, and thermographic analysis then made of samples of this product, the curve coincides very accurately with the groups of Curves B shown in the plot. The several curves in the group represent plots of the analyses of small samples of the product taken from different regions across the cross section of a finished foam product. It will be seen that Curves B are closely grouped, giving further evidence of the uniformity of the mixing of the components during the formation of the product.

A similar analysis of product produced from the identical mix formulation, but without using the mixer insert of the invention, is represented by Curve A in the graph. The substantial deviation from the desired configuration is readily apparent, attesting to incomplete mixing and reaction of the foam mix.

What is claimed is:

1. In apparatus for mixing a plurality of reactive liquid components comprising a mixing head and a nozzle assembly mounted thereon wherein said nozzle assembly comprises an open ended tubular casing having rotary agitator means therein, means in said head for driving said agitator, said agitator including an open ended basket section disposed with its open end adjacent a face of said head, liquid component feed passages in said head terminating in feed ports which open onto the face of said head within the confines of the open end of said basket section, the improvement which comprises:

an insert member adapted to be received in the open end of said agitator basket section and rotated therewith, said insert member comprising a spider having a hub and a plurality of legs, each of said legs consisting of a radially extending portion, an axially extending portion joined to the outer end of said radial portion, and a terminal portion secured to the end of the axial portion and extending partially inward in a radial direction, said spider being supported in said basket section of said rotary agitator with said terminal leg portions disposed in close axial spaced relation to said feed ports.

2. Apparatus as defined in claim 1, wherein the axial spacing between said first radial leg portions and said feed ports is about 0.010 inch to 0.015 inch.

3. Apparatus as defined in claim 1, wherein at least some of said radially extending leg portions are provided with a face inclined obliquely to the plane of rotation.

4. Apparatus as defined in claim 1, wherein the juncture of said first named radial leg portions and said axial leg portions is reinforced to withstand the bending moment imposed by high speed rotation of said rotary agitator assembly.

* * * * *